United States Patent
Uehara

(10) Patent No.: US 7,164,855 B2
(45) Date of Patent: Jan. 16, 2007

(54) OPTICAL APPARATUS

(75) Inventor: Takumi Uehara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 11/083,629

(22) Filed: Mar. 18, 2005

(65) Prior Publication Data

US 2005/0207743 A1  Sep. 22, 2005

(30) Foreign Application Priority Data

Mar. 19, 2004  (JP) ............... 2004-080412

(51) Int. Cl.
*G03B 13/36*  (2006.01)

(52) U.S. Cl. ............... 396/90; 396/103; 396/133; 396/50

(58) Field of Classification Search ............... 396/50, 396/90, 103, 133; 348/345, 357
See application file for complete search history.

(56) References Cited

U.S. PATENT DOCUMENTS 6,900,842 B1 * 5/2005 Saito et al. .............. 348/348

FOREIGN PATENT DOCUMENTS

JP  2002-207160  7/2002

* cited by examiner

*Primary Examiner*—W. B. Perkey
(74) *Attorney, Agent, or Firm*—Cowan, Liebowitz & Latman, P.C.

(57) ABSTRACT

An optical apparatus according to the present invention enables a reduced drive distance in focusing operation of a focus lens to allow focus detection and focusing operation in a short time period. The optical apparatus has a detection unit which detects the attitude of the optical apparatus; and a controller which performs focus control for driving a focus lens included in an image-taking optical system based on a focus state of the image-taking optical system. The controller changes a drive start position of the focus lens in accordance with the attitude of the optical apparatus before the focus state of the image-taking optical system starts to be taken.

7 Claims, 16 Drawing Sheets

OPTICAL APPARATUS

FIELD OF THE INVENTION

The present invention relates to focus control in an optical apparatus.

BACKGROUND OF THE INVENTION

Auto-focus control for digital cameras or video cameras employs a contrast method which sets, as an in-focus position, the position of a lens where the high-frequency component of a luminance signal provided by an image pick-up device such as a CCD sensor is at the maximum level.

Known contrast methods include a "climbing method" wherein a lens is moved in a direction in which the high-frequency component of a luminance signal (hereinafter referred to as an in-focus evaluation value (sharpness)) provided by an image pick-up device increases and the position of the lens where the in-focus evaluation value is at the maximum is set to an in-focus position, and a "full range scan method" wherein in-focus evaluation values are stored while a lens is driven throughout the distance-measuring range and the position of the lens corresponding to the maximum of the stored in-focus evaluation values is set to an in-focus position.

Description will now be made of the drive of a focus lens in these methods with reference to FIG. 16. The horizontal axis represents the position of the focus lens in an optical axis direction, while the vertical axis represents the in-focus evaluation value. A point A where the in-focus evaluation value is at the peak indicates the in-focus position.

An arrow S1 represents the drive track of the focus lens in the "climbing method." In the "climbing method," the focus lens starts scan from the infinity end, detects the slope of the curve representing the in-focus evaluation value, and is driven in a direction in which the in-focus evaluation value increases. An in-focus state is determined by reaching the peak of the in-focus evaluation value.

An arrow S2 represents the drive track of the focus lens in the "full range scan method." In the "full range scan method," the focus lens starts scan from the infinity end, is driven to the closest end, and then driven back to the position where the in-focus evaluation value is at the maximum.

Other known auto-focus methods often employed for film cameras include a method which utilizes the principles of triangulation and a method which utilizes phase difference detection.

The triangulation detection method involves applying pulse light toward a subject and detecting the light reflected therefrom by a light-receiving element placed at the distance of a predetermined baseline length from the light-applying device, thereby detecting the distance to the subject to drive a lens.

The phase difference detection method uses luminous flux passing through a plurality of different mirror areas of an image-taking lens for an imaging surface and has an optical system for secondary image formation of the luminous flux. The two images formed through the secondary image formation are detected by two line sensors, and the phase difference between the data of the two images is detected to determine the defocus state of the subject image to calculate an in-focus position. Then, predetermined lens drive is performed to achieve an in-focus state.

The abovementioned conventional contrast methods, however, have the problem of requiring a long time period for achieving focusing. Especially, the full range scan method detects an in-focus position (the maximum of the in-focus evaluation value) by scanning the full drive range from the infinity end to the closest end with the focus lens, so that the wide range must be scanned and a long time period is required to achieve focusing.

Even in the climbing method, it takes a long time period to achieve focusing when a standby position of the focus lens is located away from an in-focus position. In addition, since the in-focus evaluation value is not changed significantly at positions away from the in-focus position, it is difficult to know whether defocus is caused by front focus or rear focus, which may increase extremely the time taken to achieve focusing.

In the triangulation method and the phase difference detection method, if the focus lens stands by at the infinity end and an in-focus position is located near to the closest end, the focus lens must be driven over a long distance to the in-focus position, so that they have the problem of requiring a long time period to achieve focusing.

BRIEF SUMMARY OF THE INVENTION

It is an object of the present invention to provide an optical apparatus which has a focus adjusting function capable of reducing the drive distance in focusing operation of a focus lens to perform focus detection and focusing operation in a short time period.

An optical apparatus according to one aspect of the present invention has a detection unit which detects the attitude of the optical apparatus or another optical apparatus mounted on the optical apparatus; and a controller which performs focus control for driving a focus lens included in an image-taking optical system based on a focus state of the image-taking optical system. The controller changes a drive start position of the focus lens in accordance with the attitude of the optical apparatus or the other optical apparatus mounted on the optical apparatus before the focus state of the image-taking optical system starts to be taken.

An optical apparatus according to another aspect of the present invention has an operation switch which is used to order start a focusing movement of a focus lens; a detection unit which detects the attitude of the optical apparatus or another optical apparatus mounted on the optical apparatus; and a controller which performs-focus control for driving a focus lens included in an image-taking optical system based on a focus state of the image-taking optical system. The controller changes a drive start position of the focus lens in accordance with the attitude of the optical apparatus or the other optical apparatus mounted on the optical apparatus when the operation switch is operated.

An optical apparatus according to another aspect of the present invention has a detection unit which detects the characteristic of light incident on an image-taking optical system; and a controller which performs focus control for driving a focus lens included in the image-taking optical system based on a focus state of the image-taking optical system. The controller changes a drive start position of the focus lens in accordance with the characteristic of the light incident on the image-taking optical system before the focus state of the image-taking optical system starts to be taken.

An optical apparatus according to another aspect of the present invention has an operation switch which is used to order start a focusing movement of a focus lens; a detection unit which detects the characteristic of light incident on an image-taking optical system; and a controller which performs focus control for driving a focus lens included in the image-taking optical system based on a focus state of the image-taking optical system. The controller changes a drive start position of the focus lens in accordance with the characteristic of the light incident on the image-taking optical system when the operation switch is operated.

An optical apparatus according to another aspect of the present invention has a detection unit which detects the attitude of the optical apparatus or another optical apparatus mounted on the optical apparatus; and a controller which performs focus control for driving a focus lens included in an image-taking optical system based on a focus state of the image-taking optical system. The controller changes a drive range of the focus lens in accordance with the attitude of the optical apparatus or the other optical apparatus mounted on the optical apparatus before the focus state of the image-taking optical system starts to be taken.

An optical apparatus according to another aspect of the present invention has an operation switch which is used to order record on a record medium; a detection unit which detects the characteristic of light incident on an image-taking optical system; and a controller which performs focus control for driving a focus lens included in the image-taking optical system based on a focus state of the image-taking optical system. The controller changes a drive range of the focus lens in accordance with the characteristic of the light incident on the image-taking optical system when the operation switch is operated.

An optical apparatus according to another aspect of the present invention has an operation switch which is used to order start a focusing movement of a focus lens; a detection unit which detects the attitude of the optical apparatus or another optical apparatus mounted on the optical apparatus; and a controller which performs focus control for driving a focus lens included in an image-taking optical system based on a focus state of the image-taking optical system. The controller changes a drive range of the focus lens in accordance with the attitude of the optical apparatus or the other optical apparatus mounted on the optical apparatus when the operation switch is operated.

An optical apparatus according to still another aspect of the present invention has a detection unit which detects the characteristic of light incident on an image-taking optical system; and a controller which performs focus control for driving a focus lens included in the image-taking optical system based on a focus state of the image-taking optical system. The controller changes a drive range of the focus lens in accordance with the characteristic of the light incident on the image-taking optical system before the focus state of the image-taking optical system starts to be taken.

Other objects and further features of the present invention will become readily apparent from the following description of the preferred embodiments with reference to accompanying drawings.

DETAILED DESCRIPTION OF THE PREFERRED EMBODIMENTS

Preferred embodiment of the present invention will hereinafter be described with reference to the drawings.

Embodiment 1

Figure 1:
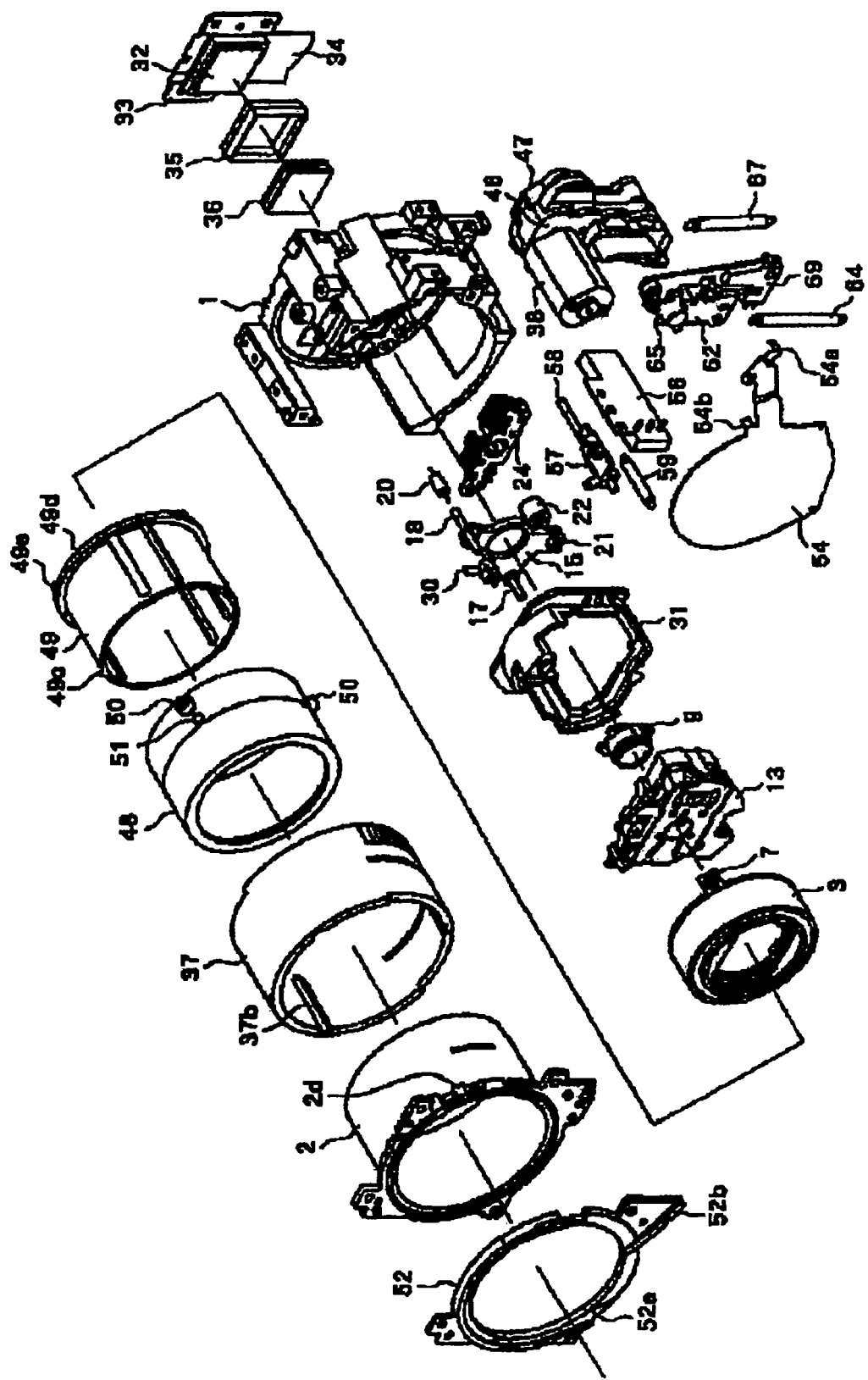
FIG. 1 is a perspective exploded view of a lens barrel of an optical apparatus in Embodiment 1 according to the present invention.
Figure 2:
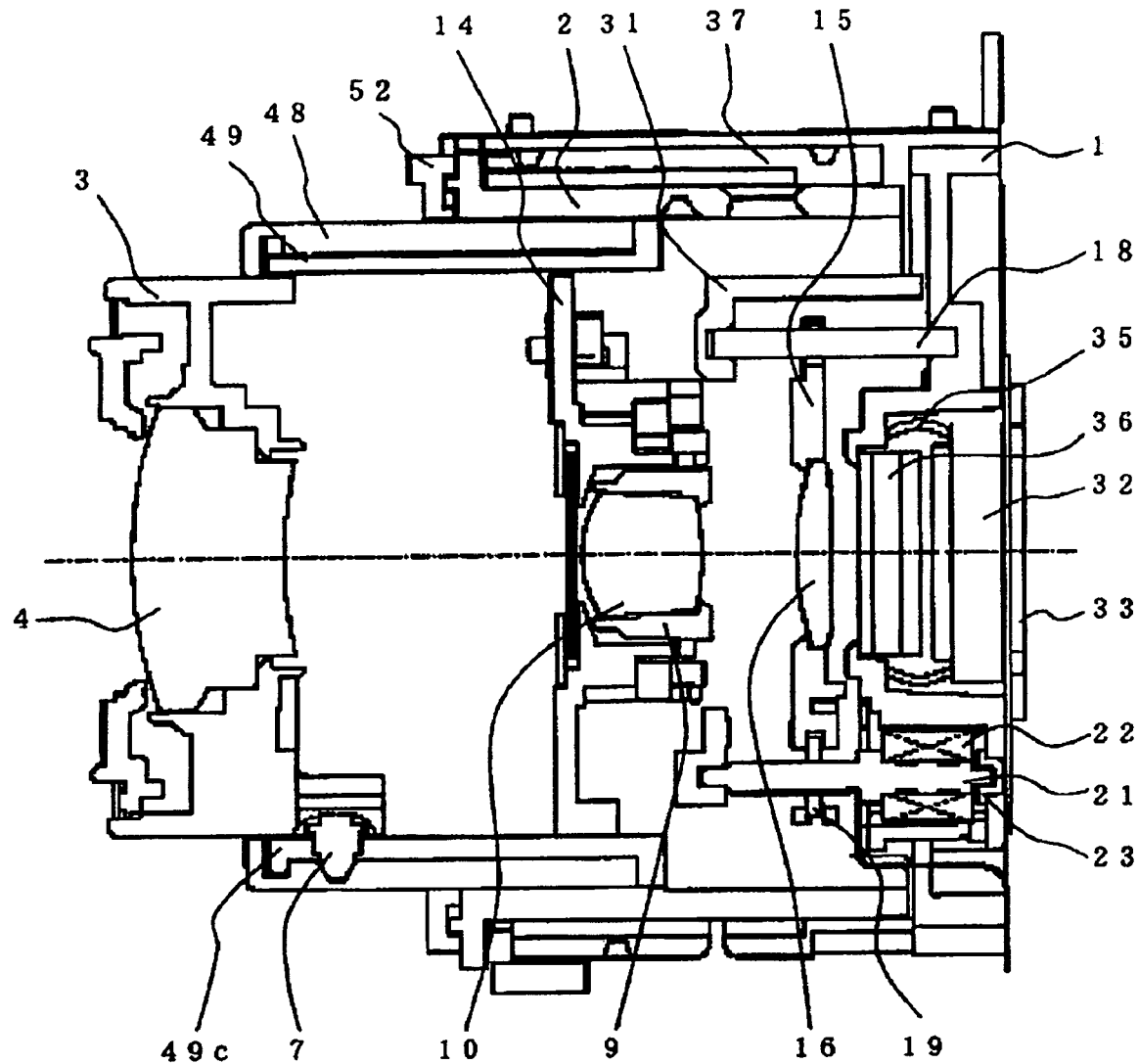
FIG. 2 is a section view of the center of the lens barrel in Embodiment 1 according to the present invention.

FIG. 1 is a perspective exploded view of a lens barrel portion of a digital camera (optical apparatus) that is Embodiment 1 of the present invention. FIG. 2 is a section view of the center of the lens barrel at the closest end (wide position). Embodiment 1 will hereinafter be described with reference to FIGS. 1 to 8.

Reference numeral 1 shows a base serving as a base portion of a lens barrel unit and forms the structure of the lens barrel unit together with a fixed barrel 2, which is fixed to the front end of the base 1 by screws. Reference numeral 3 shows a first lens barrel unit, which holds a first lens 4. Three follower pins 7 each having a taper portion at the end are pressed into the outer peripheral surface.

Reference numeral 9 shows a second lens barrel unit which holds a second lens 10 and is integrally held on an aperture base plate 14 of an aperture unit 13 by means of adhesion or the like.

Reference numeral 15 shows a third lens barrel unit, which holds a focus lens 16. The third lens barrel unit 15 is guided along guide bars 17, 18, and the position thereof in an axis direction is regulated by a nut 19 having a female thread caught on an arm portion of the third lens barrel unit 15 and is biased in a retracting direction by a tension spring 20. The focus lens 16 is driven from the closest end to the infinity (end) through the third lens barrel unit 15 to allow focusing operation.

Reference numeral 21 shows a screw, which is formed integrally with a magnet 22 and has a male thread engaging with the female thread of the nut 19. Reference numeral 23 shows a bearing metal which is pressed into the base 1 and with which one end of the screw 21 rotatably engages.

Reference numeral 32 shows an image pick-up device, which is fixed and held through adhesion or the like to a holding plate 33 fixed to the base 1 by screws. Reference numeral 34 shows a flexible wiring board, which provides a photoelectrically converted image signal for a signal processing circuit 75, later described. Reference numeral 35 shows a dust proof rubber and reference numeral 36 shows a low pass filter (LPF), both of which are fixed to the base 1 through adhesion or the like.

A drive ring 37 is rotatably engaged to the outer periphery of the fixed barrel 2. The drive ring 37 has a gear portion on part of its outer periphery. Reference numeral 38 shows a DC motor, which drives the drive ring 37 through a gear inside a gear box 47.

A moving cam ring 48 is engaged to the inner periphery of the fixed barrel 2, and a straight guide barrel 49 is engaged to the inner periphery of the moving cam ring 48. Three drive pins 50 and three follower pins 51 each having a taper portion are formed at equal intervals on the outer periphery of the moving cam ring 48. The drive pins 50 are fitted into groove portions 37b formed in the inner periphery of the drive ring 37 through holes of the fixed barrel 2. The follower pins 51 have the taper portions at their ends, which are slidably in contact with taper cam grooves formed in the inner periphery of the fixed barrel 2.

Two sets of taper cam grooves, not shown, are formed in the inner periphery of the moving cam ring 48, which are slidably in contact with the follower 7 provided for the first lens barrel unit 3 and a follower provided for the aperture base plate 14, not shown.

In addition, the side portions of the respective followers are fitted into linear grooves of the straight guide barrel 49 such that their positions in the rotation direction are regulated to prevent the rotation of the first lens barrel unit 3 and the aperture unit 13 and to allow straight movements.

A front protrusion 49c on the outer periphery of the straight guide barrel 49 abuts on a groove portion of the inner periphery at the front end of the moving cam ring 48, and a flange portion 49d at the rear end abuts on the rear end of the moving cam ring 48, thereby preventing the straight guide barrel 49 from moving in the optical axis direction relative to the moving cam ring 48. At the same time, a rear protrusion 49e is fitted into a linear groove portion of the inner periphery of the fixed barrel 2 to allow straight movements and to prevent (regulate) movements in the rotation direction.

Reference numeral 52 shows a cap, which holds a dustproof sheet, not shown, between itself and the fixed barrel 2, and has, on its front, rail portions 52a, 52b for guiding a barrier 54, later described. Reference numeral 56 shows a linear sensor, which is fixed to the base 1 by screws or the like. The circuitry constituting the linear sensor 56 is a variable resistor in which a slider, not shown, is slid to provide linearly changing output. Reference numeral 57 shows a lever which holds the slider by its arm portion and is guided along a guide bar 58. Reference numeral 59 shows a spring for biasing the lever.

The barrier 54 is rotatably supported about a shaft, not shown, standing on a barrier baser 62. The barrier 54 is urged clockwise viewed from the front of the apparatus by a closing spring 64 hung on a hook portion 54a. Reference numeral 65 shows a barrier drive lever, which is urged clockwise by an opening spring 67, hung on a hook portion, not shown. It should be noted that the urge of the above-mentioned two springs is set as "the closing spring 64<<the opening spring 67," that is, the urge of the opening spring 67 is set to be larger than the urge of the closing spring 64.

On one end of the barrier drive lever 65, a shaft, not shown, is formed at a position corresponding to one side of the barrier 54. Reference numeral 69 shows a leaf switch, which is provided through integral molding and fixed by screws to the barrier base 62. The barrier base 62 is fixed to the base 1 by screws.

Figure 3:
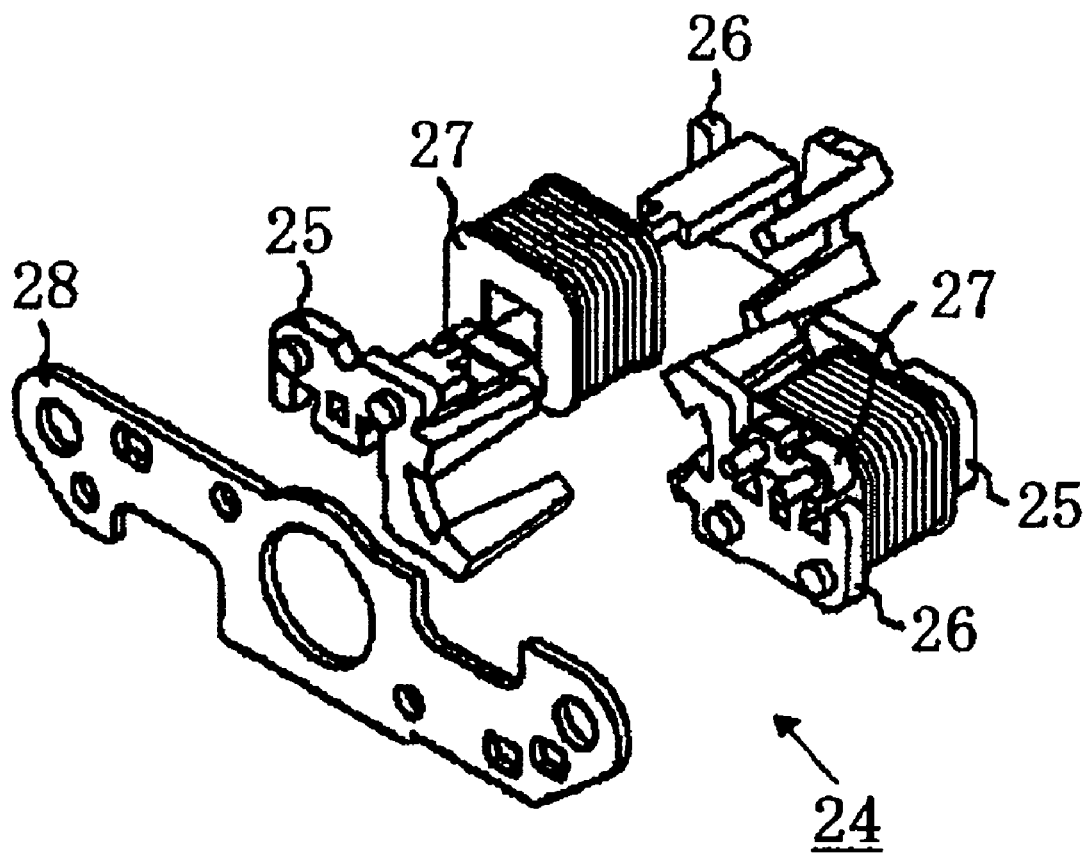
FIG. 3 is a perspective exploded view of a focus lens drive unit in Embodiment 1 according to the present invention.

Next, description will be made of the mechanism and drive operation of a focus lens driver with reference to FIGS. 3 and 4. FIG. 3 is a perspective exploded view of a step motor 24 for driving the third lens barrel unit. Two sets, each consisting of a pair of yokes 25, 26 and a coil 27 wound on a bobbin, are arranged to sandwich the magnet 22 (see FIG. 1) and placed to be linearly opposed to each other. A yoke plate 28 is screwed onto the base 1 for fixing them.

Figure 4:
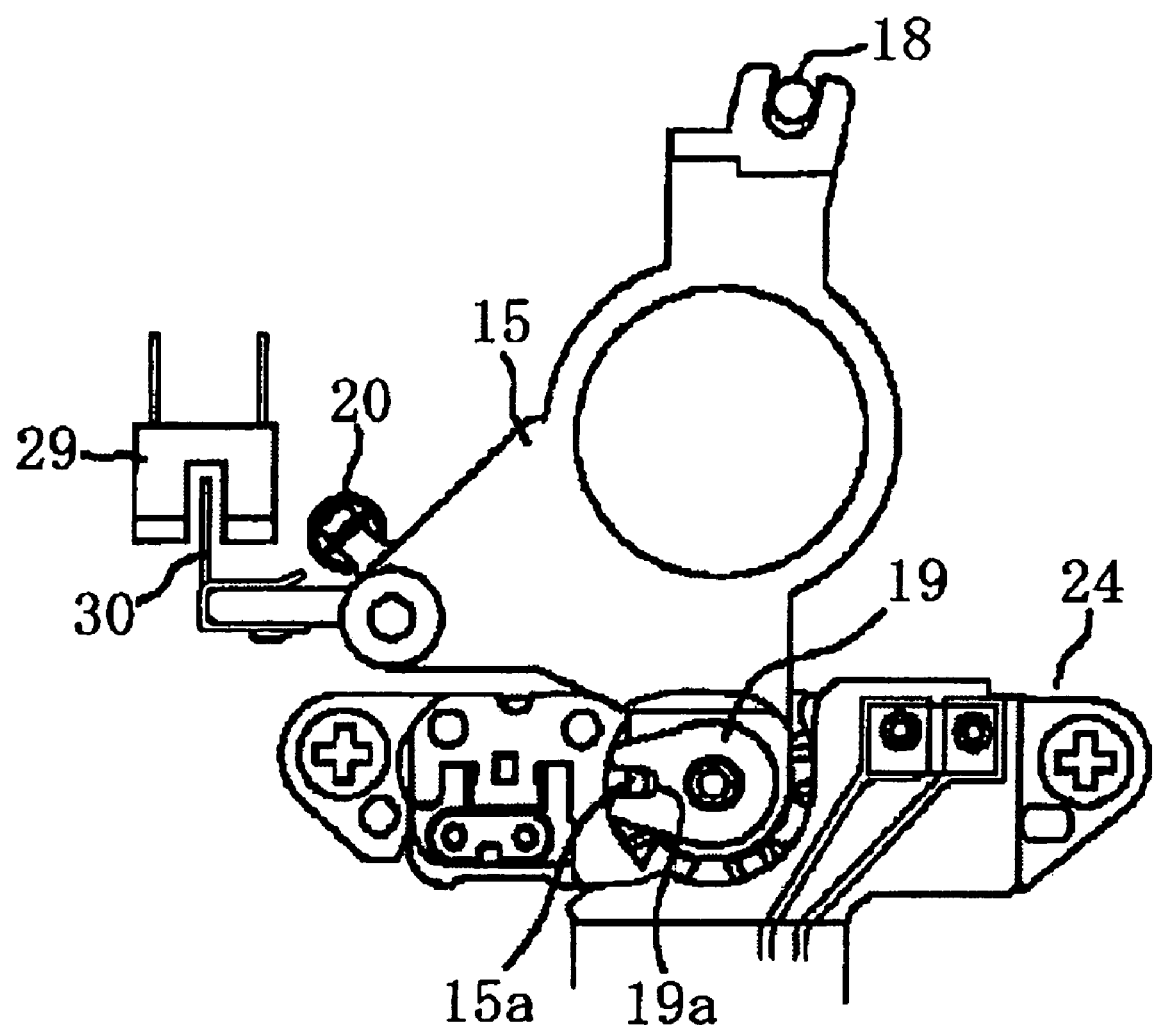
FIG. 4 is a front view showing a driver of the lens barrel in Embodiment 1 according to the present invention.

FIG. 4 is a front view showing the driver of the third lens barrel unit. Reference numeral 29 shows a photointerrupter fixed to the base 1. A slit plate 30 integrally fixed to the third lens barrel unit 15 is placed at a position such that it is retractable from a slit portion 29a of the photointerrupter 29. A member 31 shown in FIG. 1 is a cap which is fixed to the base 1 to fix the end sides of the guide bars 17, 18 and rotatably support the screw 21.

When the step motor 24 is driven, the screw 21 is rotated though the magnet 22. The screw 21 engages with the nut 19 as described above. A protrusion 15a of the third lens barrel unit 15 is fitted into a slit portion 19a formed in the nut 19 to prevent rotation thereof, so that the nut 19 is moved in the optical axis direction and the third lens barrel unit 15 follows it and moves in the optical axis direction to perform focus adjustment. The slit plate 30 enters or retracts from the slit portion 29a of the photointerrupter 29 in the drive operation range of the third lens barrel unit 15 to switch the output of the photointerrupter 29, and at this point, a counter for the step motor 24 is reset.

Next, the main system structure of the digital camera in Embodiment 1 will be described with reference to FIG. 5.

Figure 5:
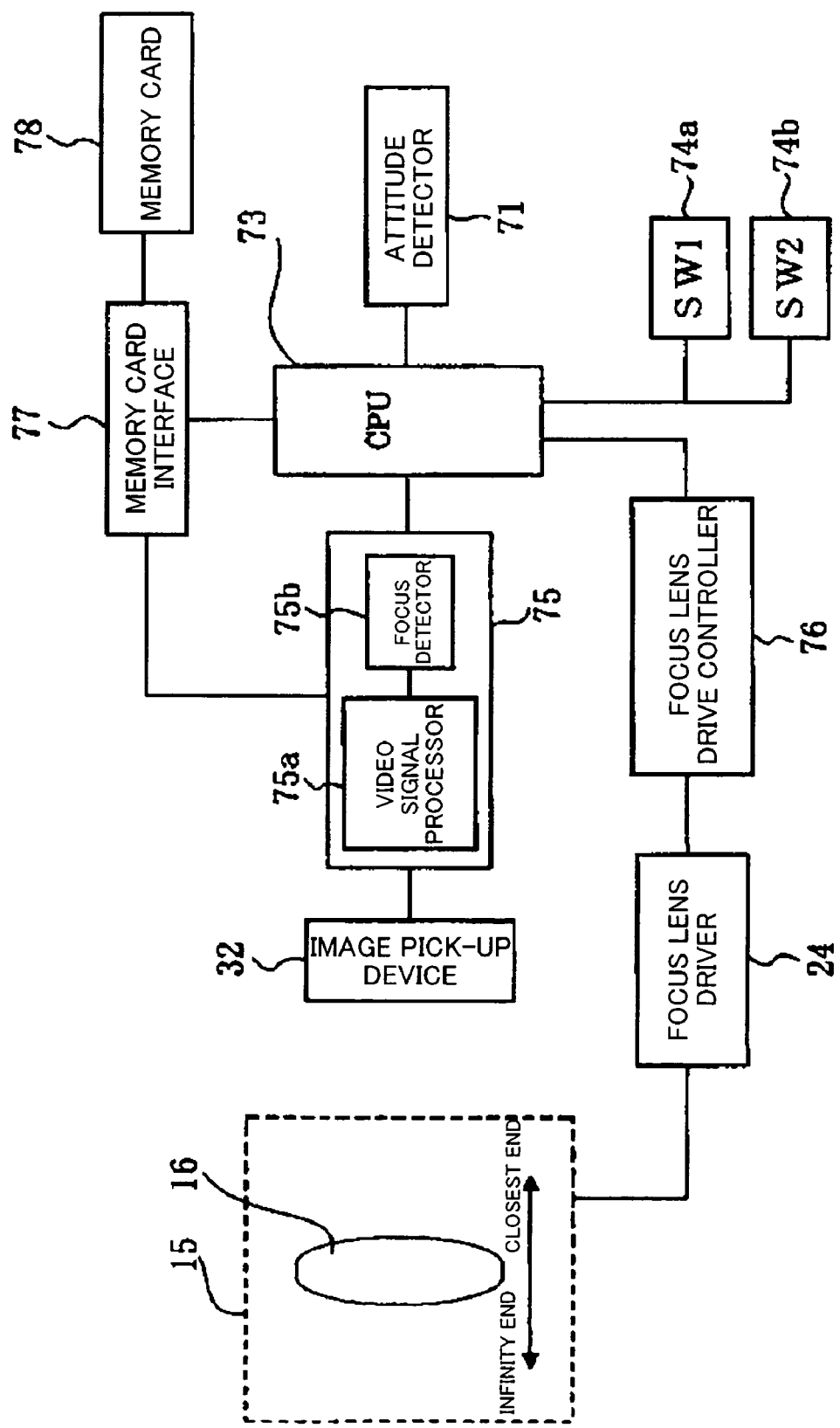
FIG. 5 shows the main system structure of the optical apparatus in Embodiment 1 according to the present invention.

In FIG. 5, reference numeral 15 shows the abovementioned third lens barrel unit having the focus lens 16. Reference numeral 24 shows the step motor which realizes the focus lens driver and drives the focus lens 16 with a control signal from a CPU 73 through a focus lens drive controller 76. Reference numeral 32 shows the image pick-up device such as a CCD sensor which converts an optical signal of a subject image into an electric signal to output a video signal. Reference numeral 74a shows a release switch SW1, and 74b a release switch SW2 (shown as SW1 and SW2, respectively, in FIG. 5). Reference numeral 75 shows the signal processing circuit, which has a video signal processor 75a for processing the video signal output from the image pick-up device 32, and a focus detector 75b.

Embodiment 1 employs the focus detection of the "climbing method" in the contrast method, wherein the focus detector 75b calculates and outputs a high-frequency component (an in-focus evaluation value (sharpness)) of a luminance signal provided on the basis of the video signal processed by the video signal processor 75a. Thus, the focus detection is performed such that the focus lens 16 is moved in a direction in which the in-focus evaluation value increases to determine the position corresponding to the maximum level of the in-focus evaluation value as an in-focus position.

An attitude detector 71 is a detector for detecting the attitude of the digital camera. A specific example of the attitude detector 71, which uses a switch making use of mercury, is schematically shown in FIG. 6.

The attitude detector 71 is formed by passing a pair of metal pieces 81, 82 through one end face of a cylindrical container 80, protruding one end of each metal piece from the cylindrical container 80, and sealing the mercury 83 in the cylindrical container 80.

The attitude detector 71 is placed substantially in parallel with an optical axis C2 of an image-taking optical system (an axis C1 is substantially in parallel with the optical axis C2) such that the metal pieces 81, 82 are situated in the front of the digital camera body.

Figure 6:
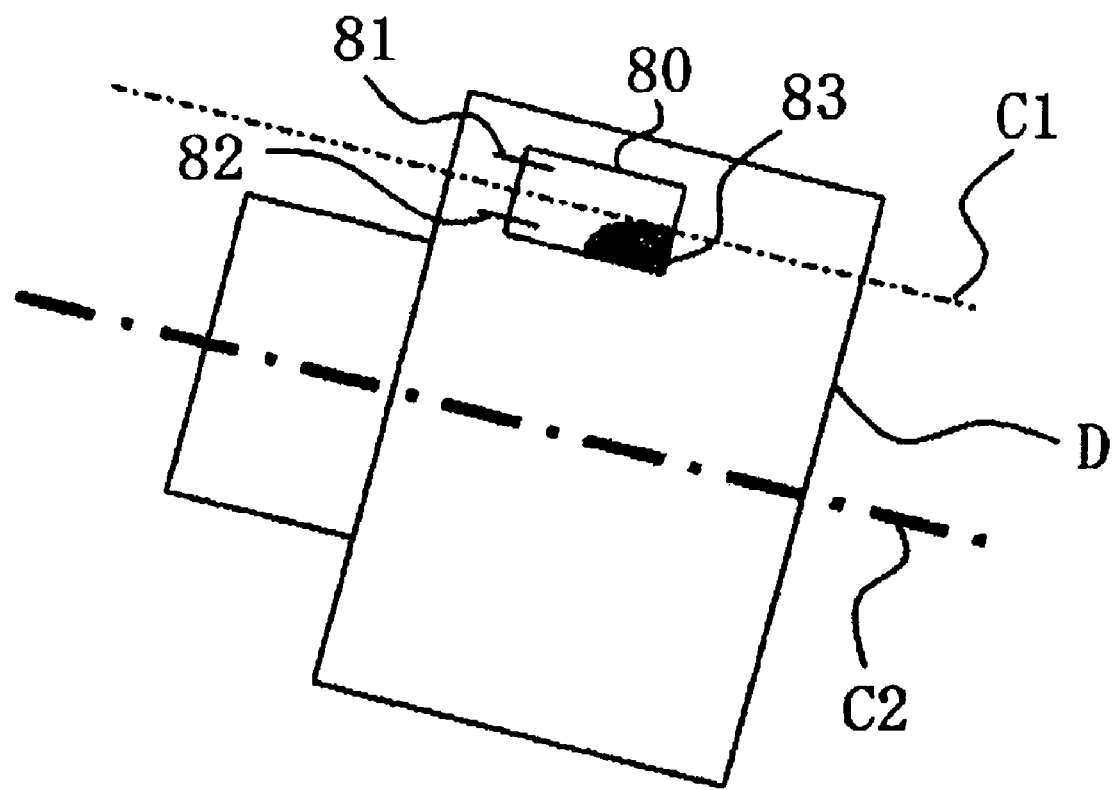
FIG. 6 is a schematic diagram of an attitude detector in Embodiment 1 according to the present invention.

When the digital camera is in an upward attitude with respect to a predetermined angle (for example, the horizontal direction of the image-taking optical system), the mercury 83 is placed at the rear end of the cylindrical container 80 to space the metal pieces 81, 82 as shown in FIG. 6. When the digital camera is in a downward attitude with respect to the predetermined angle, the metal pieces 81, 82 are short-circuited by the mercury 81. Thus, the attitude of the digital camera is detected with the on or off state of the attitude detector 71 to output information representing the attitude of the digital camera.

It is possible that an angle-detecting unit, for example, is used for the attitude detector 71 to detect the inclination (gradient) of the optical axis of the image-taking optical system with respect to the horizontal direction. In this case, for example when the optical axis of the image-taking optical system is inclined an angle θ1 upward with respect to the horizontal axis of the horizontal direction of the image-taking optical system, an upward attitude can be detected. On the contrary, when the optical axis C2 is inclined an angle θ2 downward (−2θ), a downward attitude can be detected. Since the angle detecting unit represents the angle of the camera with respect to the horizontal direction as the attitude, it is also possible to set an allowable area in which neither an upward nor downward attitude is determined if the inclination falls within a predetermined angle.

Reference numeral 78 shows a memory card on which the image subjected to the video signal processing is stored through a memory interface 77.

In the system structure as described above, the CPU 73 outputs a control signal to the focus lens drive controller 76 based on the information representing the attitude of the digital camera detected by the attitude detector 71 and controls the operation of the image pick-up device 32 and the memory card interface 77. The focus lens drive controller 76 applies a drive voltage to the focus lens driver 24 shown in FIGS. 3 and 4 based on the control signal from the CPU 73. The image taken (formed) by the image pick-up device 32 is subjected to processing such as color conversion and gamma processing in the signal processing circuit 75 and then stored in the memory card 78.

Next, description will be made of the focus detection and focusing operation of the digital camera of Embodiment 1 with reference to FIG. 7.

Figure 7:
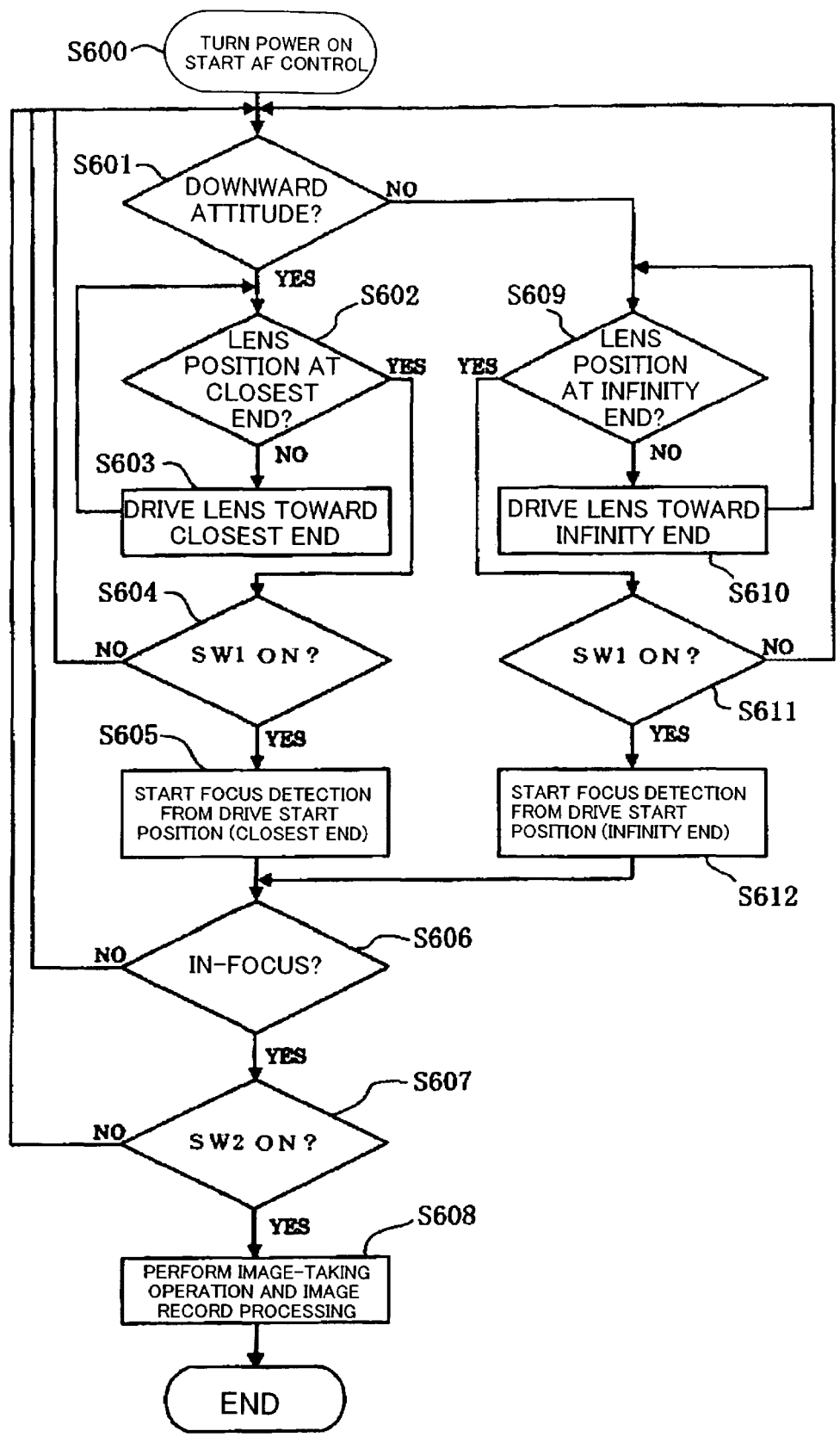
FIG. 7 is a flow chart showing focus detection processing in Embodiment 1 according to the present invention.

FIG. 7 is a flow chart showing the processing of changing the drive start position of the focus lens 16 in focus control based on the information representing the attitude of the digital camera.

First, when a power switch of the digital camera is turned on, the attitude detector 71 detects the attitude of the digital camera and the image pick-up device 32 takes the image of a subject. Then, the drive control of the focus lens 16 is started (S600).

The CPU 73 determines whether or not the digital camera is in a downward attitude based on the information representing the attitude of the digital camera output from the attitude detector 71 (S601). If the result indicates the downward attitude, the flow proceeds to step 602, or to step 609 if not (an upward attitude).

If the downward attitude is determined, the current position of the focus lens 16 of the digital camera is detected to determine whether or not the current position is at the closest end (S602). If the current position of the focus lens 16 is at the closest end, the flow proceeds to step 604. If it is not at the closest end, a signal for drive toward the closest end is output to the focus lens drive controller 76 in order to move the focus lens 16 toward the closest end, and the focus lens 16 is actually driven to the closest end (S603). After the drive to the closest end is completed, the flow returns to step 602 to detect again the position of the focus lens 16. In this manner, the drive start position of the focus lens 16 is set to the closest end if the digital camera is in the downward attitude.

Then, at step 604, the on or off state of the release; switch SW1 is detected to determine whether it is on or not. If the release switch SW1 is on, the flow proceeds to step 605, or returns to step 601 if the release switch SW1 is not on. In this manner, if the SW1 is not on after the attitude of the camera is detected, the detection of the camera attitude is repeated a plurality of times.

At step 605, the focus lens 16 is driven toward the infinity end from the closest end which is the drive start position of the focus lens 16, and the focus detection and focusing operation in the climbing method is performed on the basis of the in-focus evaluation value output from the focus detector 75*b*.

At step 606, it is determined whether or not an in-focus state is achieved. If the in-focus state is achieved, the flow proceeds to step 607 where it is determined whether the release switch SW2 is on or not. If the release switch SW2 is on, the flow proceeds to step 608 where the video signal of the subject formed on the imaging surface and output from the image pick-up device 32 is processed by the signal processing circuit 75 and saved as an image on the memory card 78 through the memory card interface 77 before the operation is completed.

If the in-focus state is not achieved, the flow returns to step 601 where the drive start position of the focus lens 16 is again set and the abovementioned processing is similarly performed.

On the other hand, if the upward attitude is determined at step 601, the flow proceeds to step 609. In the processing of step 609, the current position of the focus lens 16 is detected to determine whether or not the current position of the focus lens 16 is at the infinity end.

If the current position of the focus lens 16 is at the infinity end, the flow proceeds to step 611. If it is not at the infinity end, a signal for drive toward the infinity end is output to the focus lens drive controller 76 in order to move the focus lens 16 toward the infinity end, and the focus lens 16 is actually driven to the infinity end (S610). After the drive to the infinity end is completed, the flow returns to step 609 to detect again the position of the focus lens 16. In this manner, the drive start position of the focus lens 16 is set to the infinity end if the digital camera is in the upward attitude.

Then, at step 611, the on or off state of the release switch SW1 is detected to determine whether it is on or not. If the release switch SW1 is on, the flow proceeds to step 612, or returns to step 601 if the release switch SW is not on.

At step 612, the focus lens 16 is driven toward the closest end from the infinity end which is the drive start position of the focus lens 16, and the focus detection and focusing operation in the climbing method is performed on the basis of the in-focus evaluation value output from the focus detector 75*b*.

Thereafter, the abovementioned processing in step 606 is performed, and if the in-focus state is achieved, the processing is performed at steps 607, 608 as described above before the operation is completed.

In this manner, Embodiment 1 takes account of a certain relationship between the position of a subject relative to the camera and the distance from the camera to the subject, that is, the characteristic that the distance from the camera to the subject is often short when the subject exists below the camera and the distance from the camera to the subject is often long when the subject exists above the camera. Thus, the attitude detector 71 detects the camera attitude, and the CPU 73 serving as a controller determines whether the camera is in the upward or downward attitude based on the detection result of the attitude detector 71 (information representing the attitude) to change (set) the drive start position of the focus lens 16 to the closest end or infinity end.

Figure 8:
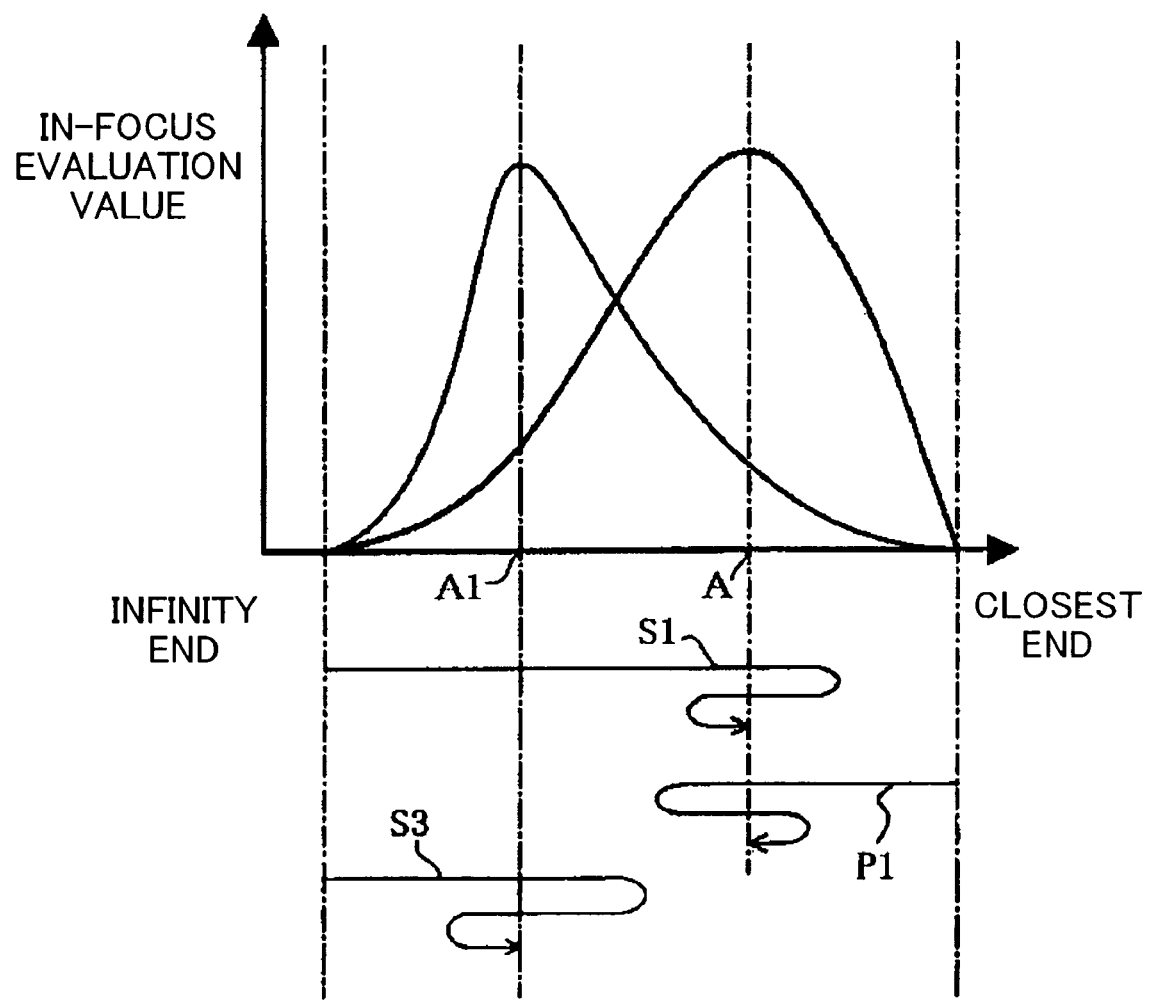
FIG. 8 shows drive tracks of a focus lens in Embodiment 1 according to the present invention.

Therefore, as apparent from drive tracks of the focus lenses shown in FIG. 8, an arrow P1 indicating the drive track of the focus lens 16 of Embodiment 1 is shorter than an arrow S1 indicating the drive track of the focus lens of the prior art described above.

More specifically, a subject at a short distance is often taken and an in-focus position A is located nearer to the closest end when the camera is in the downward attitude. The drive start position of the focus lens 16 is set (moved) to the closest end to start the focus detection and focusing operation from the closest end, thereby reducing the drive distance from the drive start position of the focus lens 16 to the in-focus position A.

On the other hand, a subject at a long distance is often taken and an in-focus position A1 is located nearer to the infinity end when the camera is in the upward attitude. The drive start position of the focus lens 16 is set (moved) to the infinity end to start the focus detection and focusing operation from the infinity end. In this manner, the drive start position and the drive direction of the focus lens in performing the focusing operation for the downward camera attitude are different from those for the upward camera attitude.

As a result, it is possible to decrease the drive distance of the focus lens 16 in the focusing control (operation) to reduce the time taken to detect focus and achieve focusing.

Embodiment 2

Figure 9:
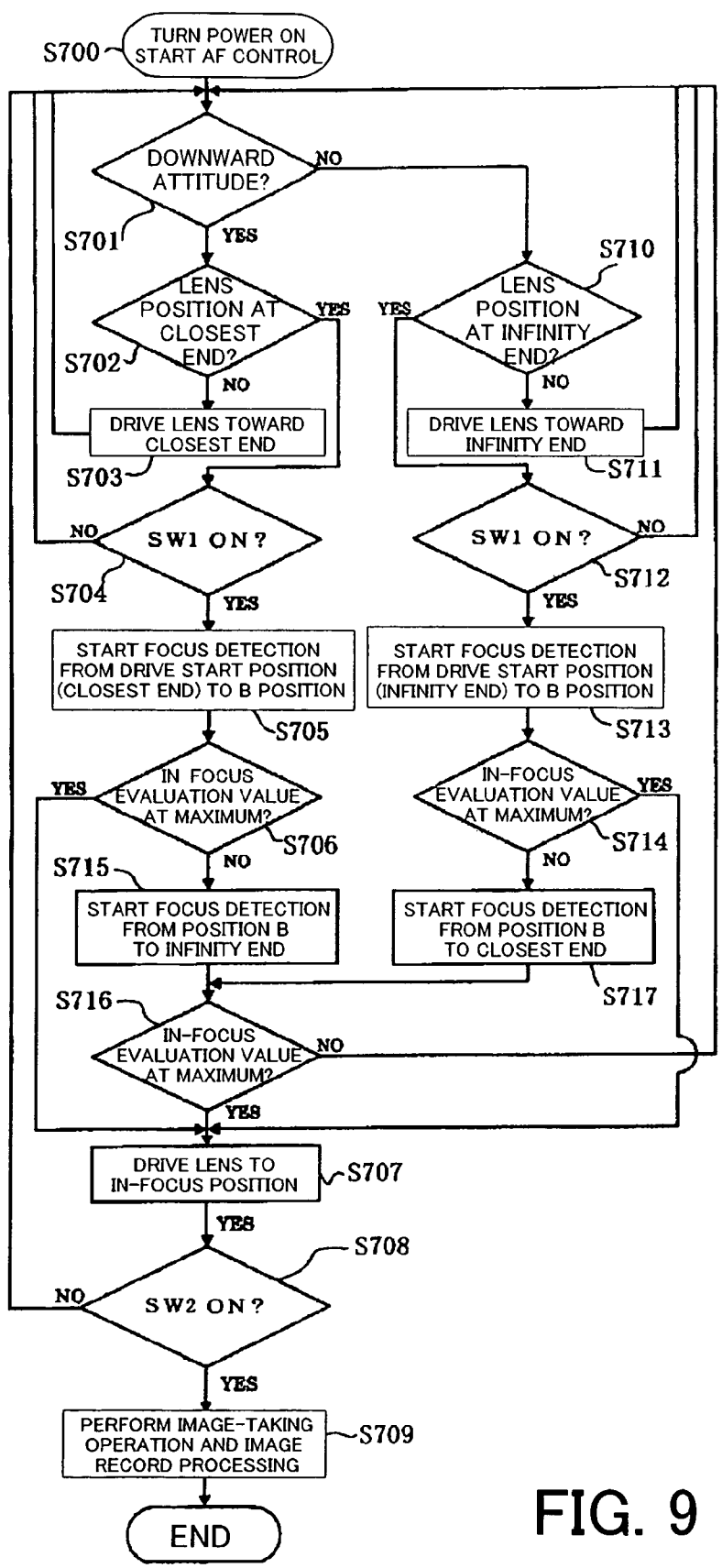
FIG. 9 is a flow chart showing focus detection processing in Embodiment 2 according to the present invention.
Figure 10:
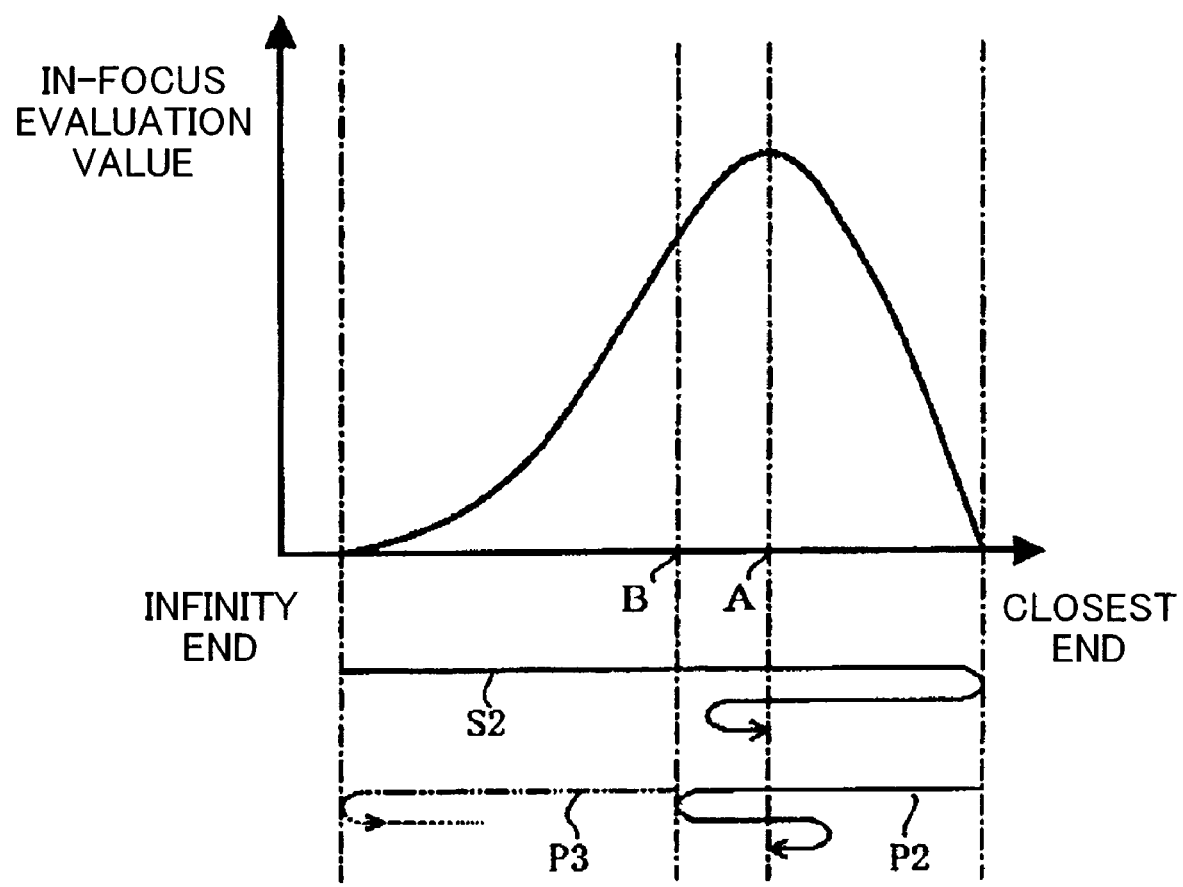
FIG. 10 shows drive tracks of a focus lens in Embodiment 2 according to the present invention.

Embodiment 2 of the present invention will be described with reference to FIGS. 9 and 10. Embodiment 2 employs the "full range scan method" in the digital camera of Embodiment 1 described above, instead of the "climbing method," to control (change) the drive range of the focus lens. FIG. 10 shows a flow chart of the operation of the digital camera in Embodiment 2. Since the other structures are identical to those in Embodiment 1, the description thereof will be omitted.

First, similarly to Embodiment 1, when the power switch of the digital camera is turned on, the attitude detector 71 detects the attitude of the digital camera and the image pick-up device 32 takes the image of a subject. Then, the drive control of the focus lens 16 is started (S700).

From step 701 to step 704 and from step 710 to step 712, operation similar to the processing from step 601 to step 604 and from step 608 to step 610 of Embodiment 1 described above is performed.

At step 702 of Embodiment 2, however, the CPU 73 sets the drive start position of the focus lens 16 to the closest end and sets the drive range of the focus lens 16 to a first range from the closet end to a position B (see FIG. 10) if a downward attitude is determined. It should be noted that the position B can be set to an arbitrary position, and in Embodiment 2, it is set to a substantially intermediate position of the full drive range of the focus lens 16 (the range from the closest end to the infinity end).

If the release switch SW1 is on, the focus lens 16 is driven toward the infinity end at step 705 to perform scan for focus detection based on the in-focus evaluation value output from the focus detector 75b from the closest end which is the drive start position of the focus lens 16 to the position B. It is determined whether or not the first range includes the position where the in-focus evaluation value is at the maximum. If the first range includes the maximum of the in-focus evaluation value, the flow proceeds to step 707 to drive the focus lens 16 to that point of the maximum, that is, the in-focus position.

If the first range from the closest end to the position B does not include the maximum of the in-focus evaluation value, the flow proceeds to step 715 where the focus lens 16 is further driven toward the infinity end to perform scan for focus detection based on the in-focus evaluation value output from the focus detector 75b in a second range from the position B to the infinity end. It is determined whether or not the second range includes the position where the in-focus evaluation value is at the maximum (S716). If the result shows the existence of the maximum value, that position of the maximum is set to the in-focus position, and the focus lens 16 is driven to the in-focus position (S707).

After step 707, the on or off state of the release switch SW2 is detected at step 708. If the release switch SW2 is on, the flow proceeds to step 709 where the video signal of the subject formed on the imaging surface and output from the image pick-up device 32 is processed by the signal processing circuit 75 and saved as an image on the memory card 78 through the memory card interface 77 before the operation is completed.

On the other hand, after the upward attitude of the digital camera is determined and the flow proceeds to step 710, the CPU 73 sets the drive start position of the focus lens 16 to the infinity end and sets the drive range of the focus lens 16 to the second range from the infinity end to the position B (see FIG. 10) if the position of the focus lens is at the infinity end at step 710.

If the release switch SW1 is on at step 712, the flow proceeds to step 713 where the focus lens 16 is driven toward the closest end to perform scan for focus detection based on the in-focus evaluation value output from the focus detector 75b from the infinity end which is the drive start position of the focus lens 16 to the position B. It is determined whether or not the second range from the infinity end to the position B includes the position where the in-focus evaluation value is at the maximum (step 714). If the second range includes the maximum of the in-focus evaluation value, the flow proceeds to step 707 to drive the focus lens 16 to that point of the maximum, that is, the in-focus position.

If it is determined that the second range does not include the maximum of the in-focus evaluation value at step 714, the flow proceeds to step 717 where the focus lens 16 is further driven toward the closest end to perform scan for focus detection based on the in-focus evaluation value output from the focus detector 75b in the first range from the position B to the closest end. It is determined whether or not the first range includes the position where the in-focus evaluation value is at the maximum (S716). If the result shows the existence of the maximum value, that position of the maximum is set to the in-focus position, and the focus lens 16 is driven to the in-focus position (S707). Thereafter, the processing of steps 708, 709 is performed and then the operation is completed.

In this manner, in Embodiment 2, the drive range and the drive direction of the focus lens 16 in performing the focusing operation are changed on the basis of the information representing the attitude of the digital camera (depending on the downward attitude or upward attitude of the camera). This can narrow the scan range for detecting the in-focus position A to reduce the time taken to achieve focusing.

Especially in the focus detection of the "full range scan method," as apparent from drive tracks of the focus lenses shown in FIG. 10, an arrow P2 indicating the drive track of the focus lens 16 of Embodiment 2 is shorter than an arrow S2 indicating the drive track of the focus lens of the prior art described above.

The scan is performed in the area in which the maximum of the in-focus evaluation value is likely to exist, in other words, in the first range from the closest to the position B which is the substantially intermediate position when the digital camera is in the downward attitude, and the scan is not performed in an unnecessary area. Thus, the scan area is narrowed and the time for detecting the focus is reduced.

If the maximum of the in-focus evaluation value is not present in the focus detection for the first range, the focus detection for the second range is performed from the position B which is the substantially intermediate position to the infinity end (an arrow P3 in FIG. 10) to allow efficient focus detection control.

Embodiment 2 is arranged to scan all the predetermined range such that, when the digital camera is in the downward attitude, the drive start position of the focus lens is set to the closest end and the focus lens is driven from the closest end to the position B to perform scan for focus detection based on the in-focus evaluation value output from the focus detector, and when the digital camera is in the upward attitude, the drive start position of the focus lens is set to the infinity end and the focus lens is driven from the infinity end to the position B to perform scan for focus detection based on the in-focus evaluation value output from the focus detector. However, the drive time can be further reduced by employing the "climbing method" described in Embodiment 1 when the drive of the focus lens is started at the closest end.

Embodiment 3

Figure 11:
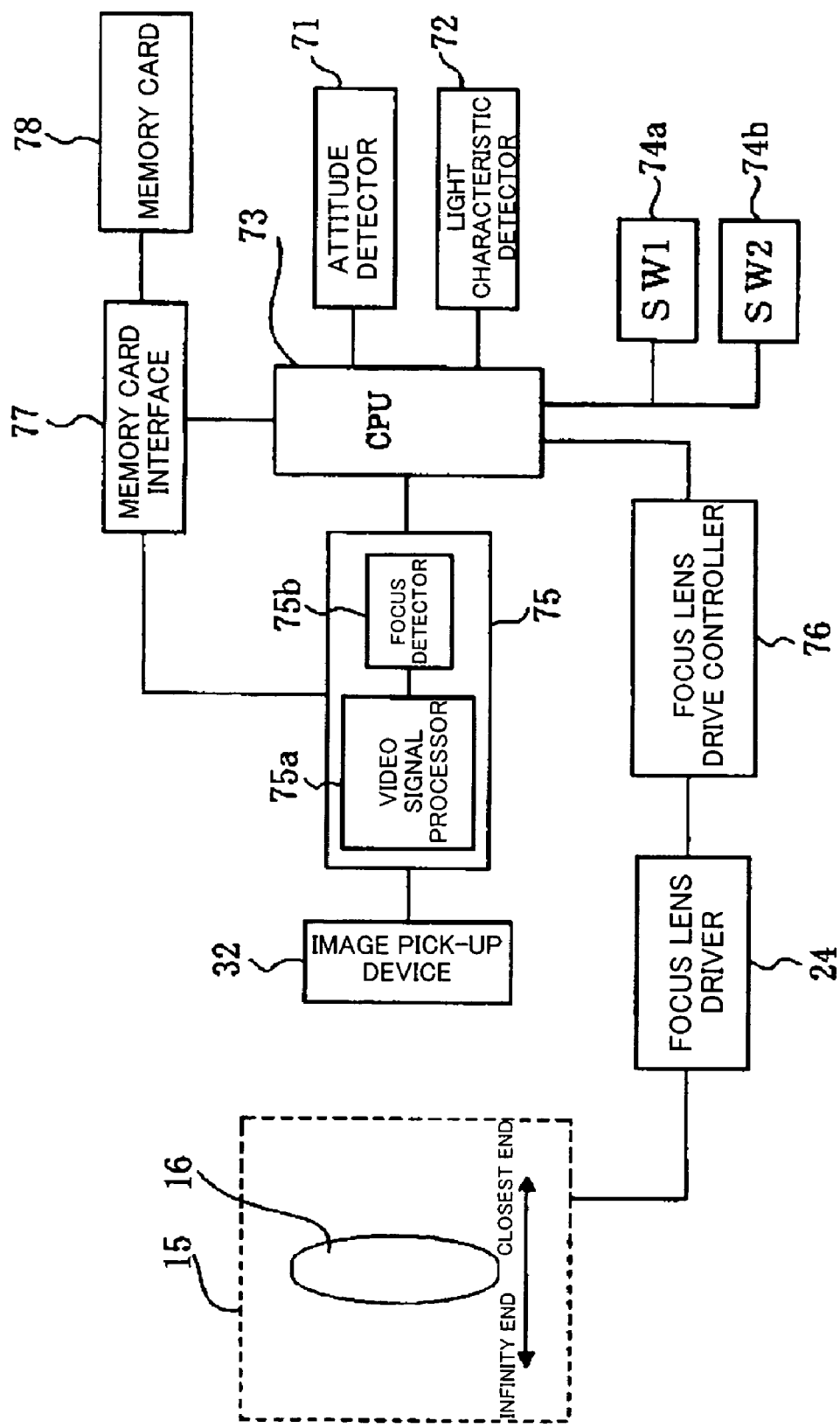
FIG. 11 shows the main system structure of an optical apparatus in Embodiment 3 according to the present invention.
Figure 12:
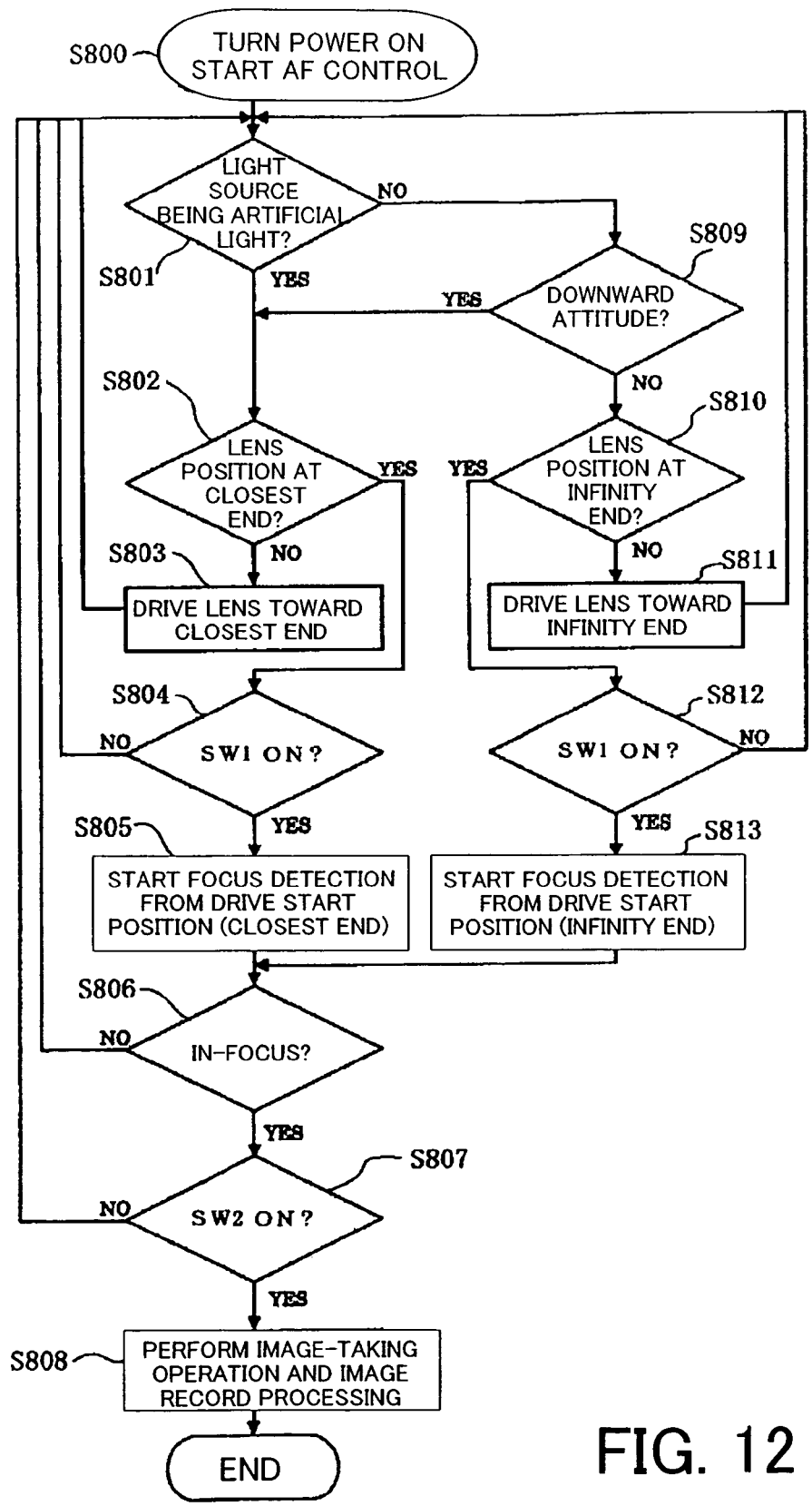
FIG. 12 is a flow chart showing focus detection processing in Embodiment 3 according to the present invention.

Embodiment 3 of the present invention will hereinafter be described with reference to FIGS. 11 and 12. Embodiment 3 employs a light characteristic detector in Embodiment 1. FIG. 11 shows the main system structure of a digital camera in Embodiment 2. FIG. 12 shows a flow chart of the operation in Embodiment 3. Since the other structures are identical to those in Embodiment 1, the description thereof will be omitted.

The light characteristic detector 72 is a detector for detecting the type of a light source (natural light, artificial light or the like). The light characteristic detector 72 determines the light source based on its color temperature or temporal change (flicker), for example.

The temporal change of the light source is explained as follows. A fluorescent lamp produces flicker at twice the frequency of a commercial power supply and provides a waveform similar to that resulting from half-wave rectification of the power supply, and the maximum of the light quantity is typically double the minimum or more. A fluorescent lamp of an inverter type for lighting at a high frequency produces flicker at a frequency as high as 40 to 50 kHz. In this case, the waveform often has a higher frequency component, and the difference between the maximum and minimum of the light quantity is often about double that of a normal fluorescent lamp. A tungsten lamp produces flicker in the shape of a sine wave at approximately twice the frequency of the power supply frequency, but the maximum of the light quantity is approximately 1.1 to 1.2 times larger than the minimum, which difference is smaller than that of the fluorescent lamp. When the light characteristic detector 72 makes the determination based on the flicker of the light source, it determines the type of the light source from the characteristic such as the flicker of each light source.

On the other hand, the color temperature of the light source is defined as 6740K for average sunlight containing the color of blue sky and as 4870K for yellowy sunlight. The color temperature of the light source is often detected with the method of making calculations based on the ratio of R/G to B/G in the portion with high luminance of the video signal read from the image pick-up device 32.

Next, the focus detection and focusing operation of the digital camera of Embodiment 3 will hereinafter be described with reference to FIG. 12.

First, when the power switch of the digital camera is turned on, the light characteristic detector 72 detects the characteristic of light (the characteristic of the light source) incident on the image-taking optical system of the digital camera, and the attitude detector 71 detects the attitude of the digital camera. The image pick-up device 32 takes the image of a subject. Then, the drive control of the focus lens 16 is started (S800).

The CPU 73 determines whether the light source of the light incident on the image-taking optical system is natural light or artificial light based on the detection result (information representing the characteristic of the light) of the light characteristic detector 72 (S801). If the result shows that the light source is artificial light with the abovementioned light characteristic detection method, the flow proceeds to step 802, or to step 809 if it is determined that the light source is not artificial light, that is, natural light.

At step 802, the current position of the focus lens 16 of the digital camera after the determination of artificial light based on the information representing the light characteristic is detected to determine whether the current position is at the closest end or not. If the focus lens 16 is at the closest end, the flow proceeds to step 804. If it is not at the closest end, a signal for drive toward the closest end is output to the focus lens drive controller 76 in order to move the focus lens 16 toward the closest end, and the focus lens 16 is actually driven to the closest end (S803). After the drive to the closest end is completed, the flow returns to step 801 to detect again the characteristic of the light.

On the other hand, if the light source is determined as natural light based on the information representing the light characteristic at step 801, the flow proceeds to step 809 where it is determined whether or not the digital camera is in the downward attitude with respect to a predetermined angle based on the detection result of the attitude detector 71 similarly to Embodiment 1 described above. If the result shows the downward attitude with the abovementioned attitude detection method, the flow proceeds to step 802, or to step 810 if not (if it is in the upward attitude with respect to the predetermined angle).

Subsequent processing (the processing from step 804 to 813) is performed similarly to the processing from step 604 to 612 shown in FIG. 7 of Embodiment 1 described above.

In Embodiment 3, the light characteristic detector 72 detects whether the light incident on the image-taking optical system of the digital camera is natural light or artificial light to change the drive start position of the focus lens 16 prior to the attitude detection of the attitude detector 71. Specifically, the drive start position is always set to the closest end if the artificial light is incident regardless of the attitude, so that the focus lens 16 performs the focus detection and focusing operation from the closest end for taking images in limited space such as indoors even when the camera is in the upward attitude, thereby reducing the time taken for the focus detection and focusing operation. In this manner, the drive start position and the drive direction of the focus lens in performing the focusing operation when the camera is in the upward attitude with natural light are different from those when the camera is in the downward attitude with natural light and the characteristic of the light incident on the image-taking optical system of the digital camera is artificial light. The other operations and effects are achieved similarly to Embodiment 1 described above.

It is also possible that the light characteristic detector 72 of Embodiment 3 is applied to Embodiment 2 described above, and when the light is determined as artificial light, the drive start position of the focus lens 16 is set to the closest end and the drive range of the focus lens 16 is set to the first range from the closest end to the position B.

Embodiment 4

Figure 13:
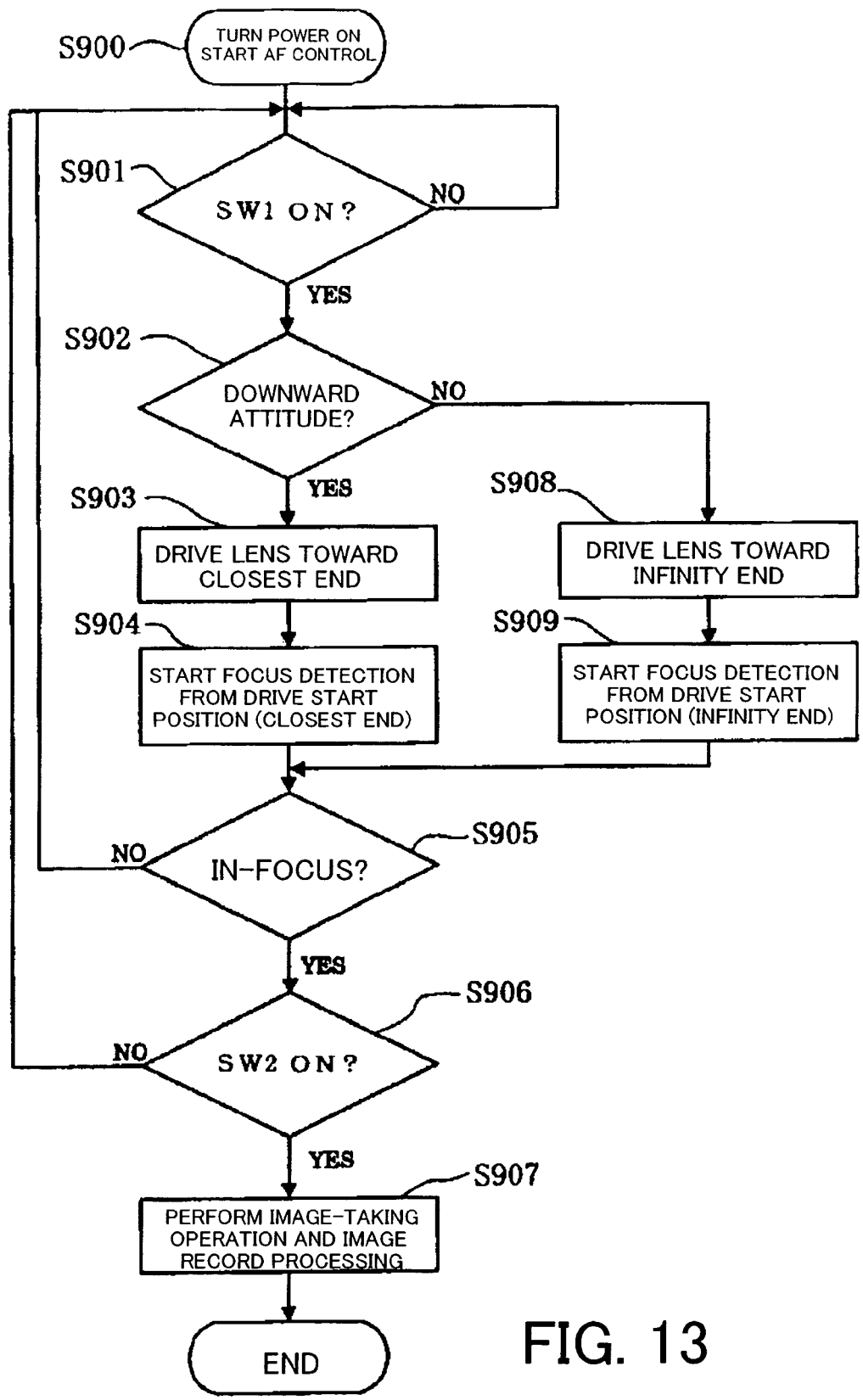
FIG. 13 is a flow chart showing focus detection processing in Embodiment 4 according to the present invention.

Embodiment 4 of the present invention will be described with reference to FIG. 13. Embodiment 4 is provided for reducing power consumption in the drive control of Embodiment 1 described above. FIG. 13 shows a flow chart of the operation of a digital camera in Embodiment 4. Since the other structures are identical to those in Embodiment 1, the description thereof will be omitted.

First, similarly to Embodiment 1, when the power switch of the digital camera is turned on, the attitude detector 71 detects the attitude of the digital camera, and the image pick-up device 32 takes the image of a subject. Then, the drive control of the focus lens 16 is started (S900).

The CPU 73 detects the on or off state of the release switch SW1 (S901). If the release switch SW1 is on, the flow proceeds to step 902, or returns to step 901 if it is not on.

At step 902, the CPU 73 determines whether or not the digital camera is in the downward attitude based on the detection result of the attitude detector 71, similarly to Embodiment 1 described above. The result shows the downward attitude, the flow proceeds to step 903, or to step 908 if not (if the camera is in the upward attitude).

At step 903, the focus lens 16 is driven toward the closest end without detecting the current position of the focus lens 16 of the digital camera after the determination of the upward attitude thereof. Then, the flow proceeds to step 904 where the focus lens 16 is driven from the closest end toward the infinity end to perform the focus detection and focusing operation in the climbing method based on the in-focus evaluation value output from the focus detector 75*b*.

On the other hand, if the upward attitude is determined and the flow proceeds to step 908, the focus lens 16 is driven toward the infinity end without detecting the current position of the focus lens 16. The flow proceeds to step 909 where the focus lens 16 is driven from the infinity end toward the closest end to perform the focus detection and focusing operation in the climbing method based on the in-focus evaluation value output from the focus detector 75*b*.

The CPU 73 determines whether an in-focus state is achieved or not (S905). If it is determined that the in-focus state is achieved, the image pick-up device 32 takes an image which is then saved on the memory card 78 through the signal processing circuit 75 and the memory card interface 77 before the operation is completed. If the in-focus state is not achieved, the flow returns to step 901.

Embodiment 4 achieves the operations and effects similar to those of Embodiment 1 described above, and enables reduced power consumption since the focus lens driver 24 is not operated before the release switch SW1 is pressed.

It should be noted that Embodiment 4 can be applied to the detection processing of the on/off state of the release switch SW1 in Embodiments 2 and 3 described above to provide similar operations and effects.

Embodiment 5

Figure 14:
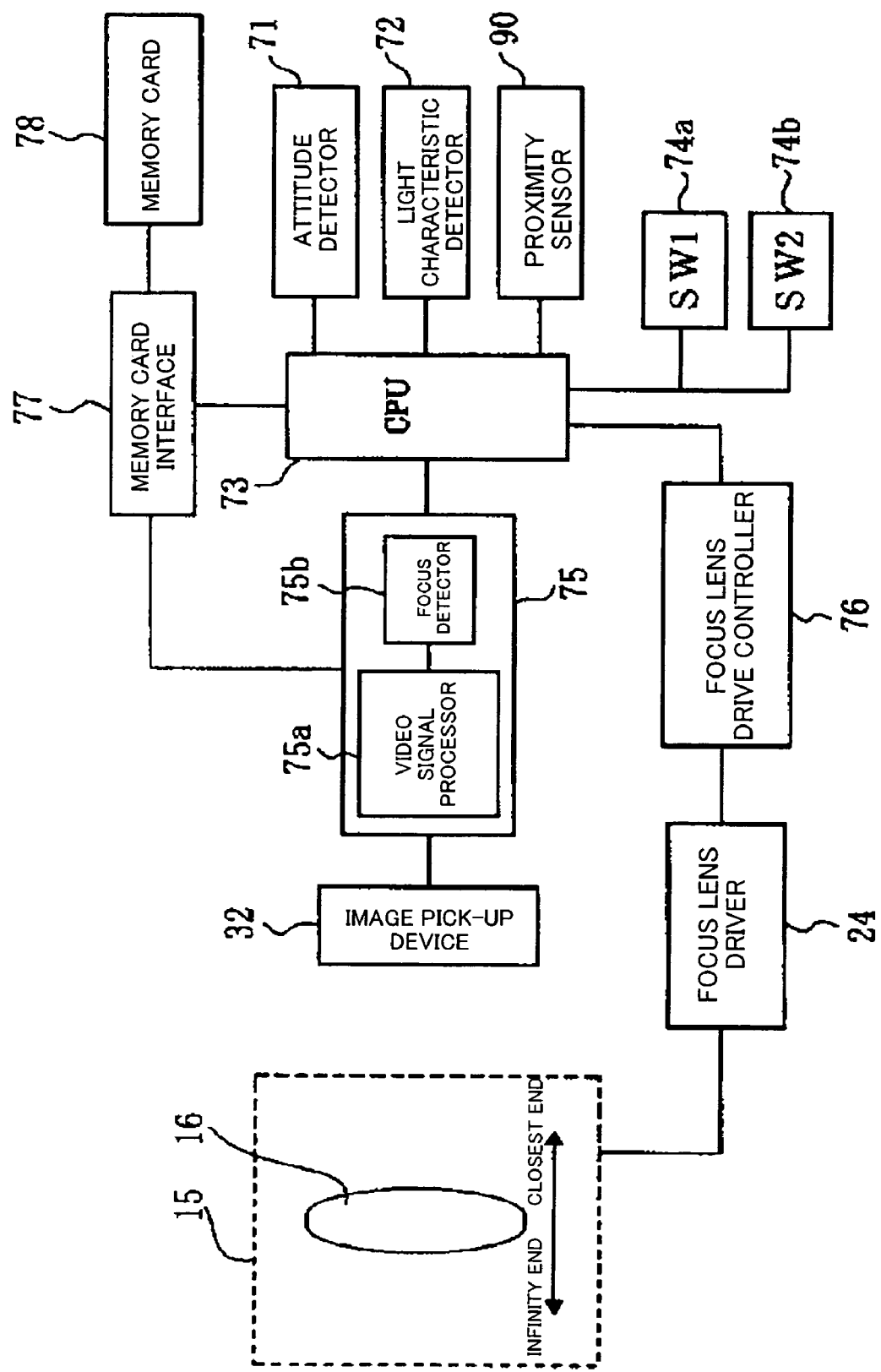
FIG. 14 shows the main system structure of an optical apparatus in Embodiment 5 according to the present invention.
Figure 15:
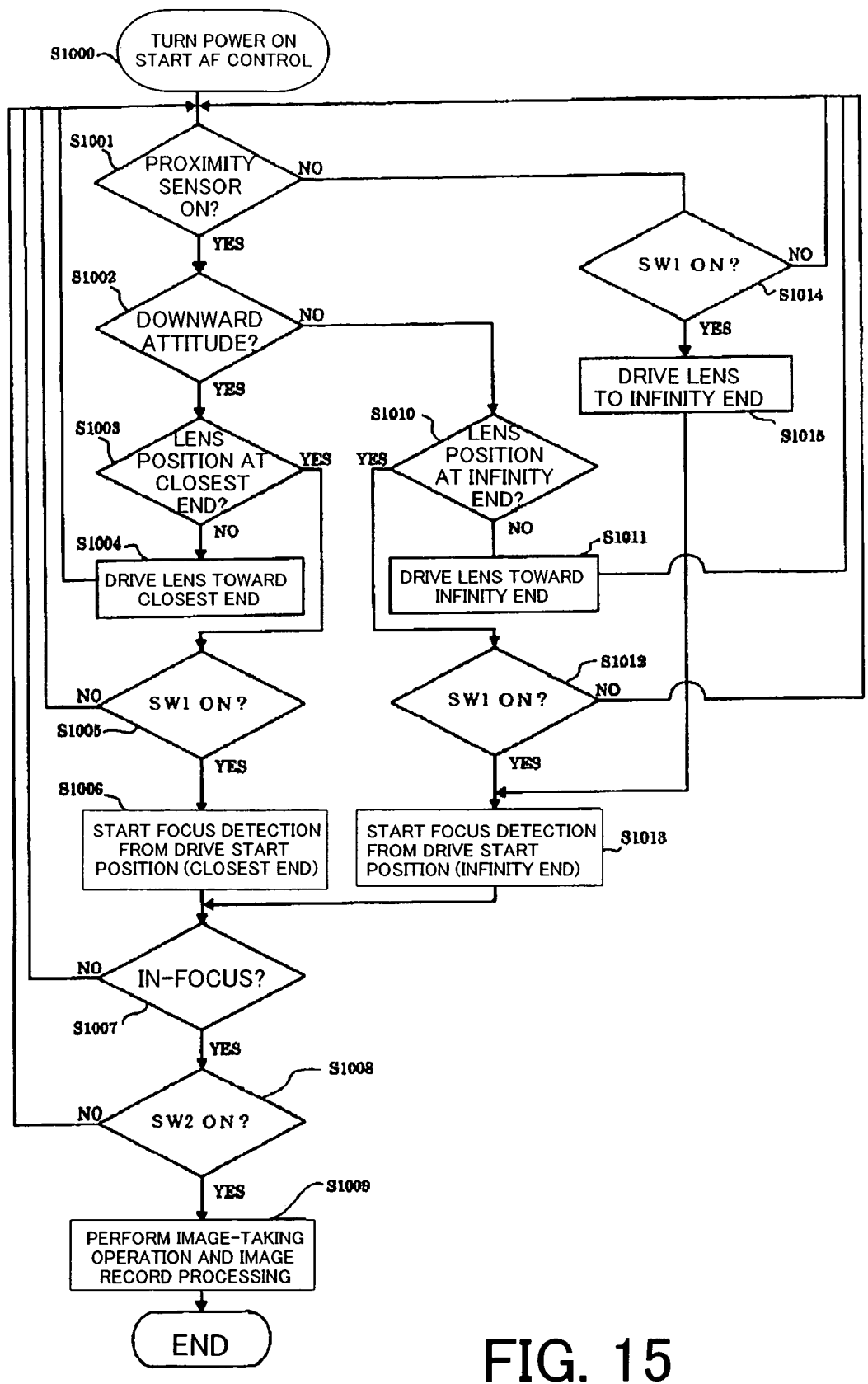
FIG. 15 is a flow chart showing focus detection processing in Embodiment 5 according to the present invention.
Figure 16:
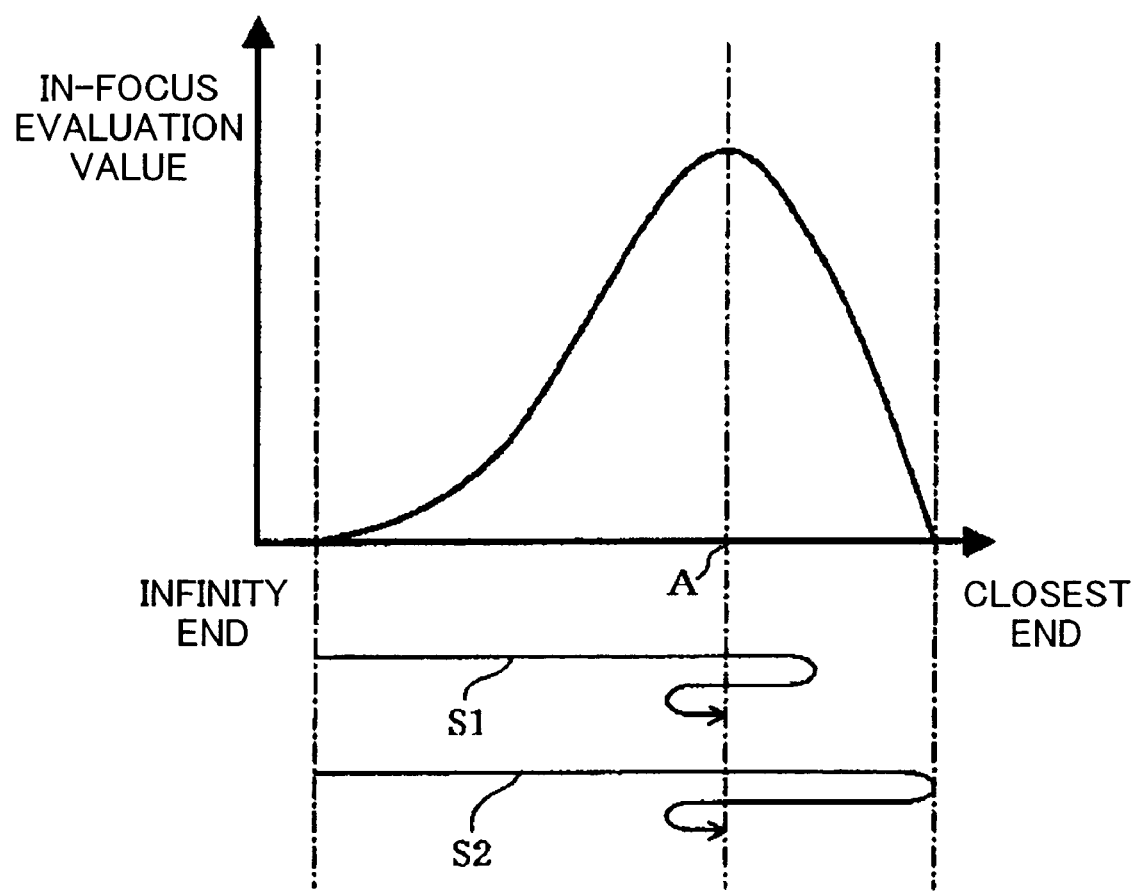
FIG. 16 shows drive tracks of a focus lens in conventional focus control.

Embodiment 5 of the present invention will be described with reference to FIGS. 14 and 15. Embodiment 5 is realized by adding a proximity sensor in the drive control of Embodiment 1 described above. FIG. 14 shows the main system structure of a digital camera in Embodiment 5. FIG. 15 shows a flow chart of the operation of the digital camera in Embodiment 5. Since the other structures are identical to those in Embodiment 1, the description thereof will be omitted.

The digital camera of Embodiment 5 has an optical view finder (hereinafter abbreviated as OVF), not shown, and a proximity sensor circuit 90, not shown, close to the OVF.

The proximity sensor has a light emitter for emitting light toward an operator and a detector for detecting the light reflected therefrom, detects whether or not the operator (an object) exists in a certain range at the rear of the OVF, and turns on if any object exists or turns off if no object exists, byway of example. The proximity sensor circuit 90 detects the on/off state of the proximity sensor.

First, similarly to Embodiment 1, when the power switch of the digital camera is turned on, the attitude detector 71 detects the attitude of the digital camera, and the image pick-up device 32 takes the image of a subject. Then, the drive control of the focus lens 16 is started (S1000).

At step 1001, the on/off state of the proximity sensor is detected, and the flow proceeds to step 1002 if the proximity sensor is on. The processing from step 1002 to step 1013 is performed similarly to the processing from step 601 to 612 shown in FIG. 7 of Embodiment 1 described above, in which the drive start position of the focus lens 16 is changed, the focus detection and focusing operation is performed, and the image is taken.

On the other hand, if it is determined that the proximity sensor is off at step 1001, the flow proceeds to step 1014 where the on/off state of the release switch SW1 is detected. If the release switch SW1 is on, the flow proceeds to step 1015 where the focus lens 16 is driven to the infinity end as the drive start position. The flow proceeds to step 1013 where the focus detection and focusing operation is performed.

According to Embodiment 5, since the focus lens driver 24 is activated upon the operator looking through the OVF for taking images, the power consumption can be reduced as compared with Embodiments described above. In addition, the focus lens 16 has already been driven to the closest end or infinity end when the release switch SW1 is pressed, so that the time for the focus detection and focusing operation is reduced as compared with Embodiment 4.

While the present invention has been described with the digital camera as an example, it is applicable to an autofocus apparatus of a video camera or a camera provided with a pan-head having a pan/tilt function.

While Embodiments 1 to 5 described above have been explained of the AF in the climbing and full range scan methods of the contrast method, the present invention is applicable to AF with phase difference detection widely employed for single-lens reflex cameras, for example. Specifically, in that application, the focus detector 75b in Embodiment 1 described above is replaced with an AF sensor unit (such as a condenser lens, a separator lens, and a CCD) for use in the phase difference detection method. In this case, the drive start position of the focus lens 16 is changed (moved) to the closest end or the infinity end based on the attitude detection or the light source characteristic detection described above to allow a reduction in the distance between the focus lens 16 and the in-focus position, resulting in a reduction in time taken for focusing operation. The present invention is similarly applicable to the triangulation detection method.

In addition, while Embodiments 1 to 5 have been described of the camera having the camera body integral with the lens apparatus, it is possible that the abovementioned system structure is placed only in the lens apparatus or in the camera body, or the attitude detector 71 is placed in the camera body and the other structures are disposed in the lens apparatus. Besides, the present invention is applicable to an optical apparatus mounted on another optical apparatus such as a camera.

As described above, according to each of Embodiments 1 to 5 described above, the drive start position and the drive range of the focus lens in the focus control are changed on the basis of the information representing the attitude of the optical apparatus or another optical apparatus mounted on that optical apparatus or the information representing the characteristic of the light incident on the image-taking optical system, so that the drive distance and the scan range of the focus lens can be reduced in the focus control (operation) to realize the optical apparatus which allows a reduction in time taken for focusing.

While the drive of the focus lens to the appropriate drive start position is repeatedly performed before the switch SW1 is turned on in each of Embodiments 1 to 5, it is also contemplated that the determination result of the camera attitude is only stored before the switch SW1 is pressed and the focus lens is driven to the appropriate drive start position to perform focusing operation after the switch SW1 is turned on. This can reduce power consumption as compared with the case where the focus lens is driven several times before the switch SW1 is turned on.

This application claims priority from Japanese Patent Application No. 2004-080412 filed on Mar. 19, 2004, which is hereby incorporated by reference herein.

What is claimed is:

1. An optical apparatus comprising:
a detection unit which detects the characteristic of light incident on an image-taking optical system; and
a controller which performs focus control for driving a focus lens included in the image-taking optical system based on a focus state of the image-taking optical system,
wherein the controller changes a drive start position of the focus lens in accordance with the characteristic of the light incident on the image-taking optical system before the focus state of the image-taking optical system starts to be taken.

2. An optical apparatus comprising:
an operation switch which is used to order start a focusing movement of a focus lens;
a detection unit which detects the characteristic of light incident on an image-taking optical system; and
a controller which performs focus control for driving a focus lens included in the image-taking optical system based on a focus state of the image-taking optical system,
wherein the controller changes a drive start position of the focus lens in accordance with the characteristic of the light incident on the image-taking optical system when the operation switch is operated.

3. The optical apparatus according to claim 2, wherein the controller changes a drive direction of the focus lens in accordance with the characteristic of the light incident on the image-taking optical system.

4. The optical apparatus according to claim 2, wherein the controller changes the drive start position of the focus lens to a closest end when the characteristic of the light incident on the image-taking optical system is artificial light.

5. The optical apparatus according to claim 2, wherein the detection unit repeatedly detects the characteristic of the light incident on the image-taking optical system.

6. An optical apparatus comprising:
an operation switch which is used to order record on a record medium;
a detection unit which detects the characteristic of light incident on an image taking optical system; and
a controller which performs focus control for driving a focus lens included in the image-taking optical system based on a focus state of the image-taking optical system,
wherein the controller changes a drive range of the focus lens in accordance with the characteristic of the light incident on the image-taking optical system when the operation switch is operated, and
the controller changes a drive direction of the focus lens in accordance with the characteristic of the light incident on the image-taking optical system.

7. An optical apparatus comprising:
an operation switch which is used to order record on a record medium;
a detection unit which detects the characteristic of light incident on an image-taking optical system; and
a controller which performs focus control for driving a focus lens included in the image-taking optical system based on a focus state of the image-taking optical system,
wherein the controller changes a drive range of the focus lens in accordance with the characteristic of the light incident on the image-taking optical system when the operation switch is operated, and
the controller changes the drive range to a range from a closest end to a predetermined position when the characteristic of the light incident on the image-taking optical system is artificial light.

* * * * *